(12) United States Patent
Lu et al.

(10) Patent No.: US 12,060,724 B2
(45) Date of Patent: Aug. 13, 2024

(54) RAPID ASSEMBLY STRUCTURE FOR ASSEMBLING UPRIGHT POST OF OUTDOOR PRODUCT AS WELL AS OUTDOOR UMBRELLA AND OUTDOOR TENT

(71) Applicant: Zhejiang Tianji Leisure Products CO., LTD, Zhejiang (CN)

(72) Inventors: Shu Lu, Zhejiang (CN); Rongjie Lu, Zhejiang (CN)

(73) Assignee: Zhejiang Tianji Leisure Products CO., LTD, Zhejiang (CN)

( * ) Notice: Subject to any disclaimer, the term of this patent is extended or adjusted under 35 U.S.C. 154(b) by 0 days.

(21) Appl. No.: 18/176,481

(22) Filed: Mar. 1, 2023

(65) Prior Publication Data
US 2023/0407663 A1 Dec. 21, 2023

(30) Foreign Application Priority Data

May 30, 2022 (CN) .......................... 202221315608.X

(51) Int. Cl.
*E04H 12/22* (2006.01)
*E04H 15/44* (2006.01)
*F16B 7/18* (2006.01)
*A45B 23/00* (2006.01)

(52) U.S. Cl.
CPC ......... *E04H 12/2269* (2013.01); *E04H 15/44* (2013.01); *F16B 7/182* (2013.01); *A45B 2023/0012* (2013.01)

(58) Field of Classification Search
CPC ..... E04H 12/2269; E04H 15/44; F16B 7/182; A45B 2023/0012

USPC .......................................................... 403/296
See application file for complete search history.

(56) References Cited

U.S. PATENT DOCUMENTS

| | | | | |
|---|---|---|---|---|
| 582,948 A | * | 5/1897 | Pinover | B25G 3/28 403/277 |
| 2,446,406 A | * | 8/1948 | Beyerle | F16B 29/00 279/24 |
| 2,868,602 A | * | 1/1959 | Drezner | F16B 12/48 248/188.8 |
| 3,371,671 A | * | 3/1968 | Kirkham | E04H 15/44 135/156 |

(Continued)

FOREIGN PATENT DOCUMENTS

| | | | | |
|---|---|---|---|---|
| CN | 210841818 | | 6/2020 | |
| DE | 19633307 | A1 * | 2/1998 | .......... E04B 1/5837 |

(Continued)

*Primary Examiner* — Taylor Morris
(74) *Attorney, Agent, or Firm* — JCIPRNET

(57) ABSTRACT

A rapid assembly structure includes an upright post, wherein the upright post includes a first upright post and a second upright post; the rapid assembly structure further includes a sleeve assembly, wherein the sleeve assembly includes a first sleeve base and a second sleeve base, the first sleeve base is configured to install the first upright post in a fitting manner, the second sleeve base is configured to install the second upright post in a fitting manner and the first upright post is connected to the second upright post by the fit of the first sleeve base and the second sleeve base; after the first sleeve base is in docking fit with the second sleeve base, a partial side wall in the first sleeve base extends outwards and is in close fit with an inner cavity wall of the first upright post.

6 Claims, 5 Drawing Sheets

(56) References Cited

U.S. PATENT DOCUMENTS

| | | | | |
|---|---|---|---|---|
| 3,687,499 | A * | 8/1972 | Guilfoyle, Sr. | F16B 7/182 403/292 |
| 4,013,372 | A * | 3/1977 | Lay | F16B 7/18 403/258 |
| 4,141,554 | A * | 2/1979 | Sherwin | F42B 6/06 473/585 |
| 4,147,444 | A * | 4/1979 | Herb | F16B 13/12 411/80.6 |
| 4,238,164 | A * | 12/1980 | Mazzolla | F16B 7/14 403/109.5 |
| 5,333,824 | A * | 8/1994 | Dubinsky | F16B 7/182 411/177 |
| 5,411,347 | A * | 5/1995 | Bowmer | E04C 5/165 52/848 |
| 5,575,582 | A * | 11/1996 | Frastaci | H05B 7/085 373/91 |
| 5,704,728 | A * | 1/1998 | Chan | F21V 21/116 403/292 |
| 5,876,147 | A * | 3/1999 | Longo | F16B 7/182 403/109.5 |
| 6,073,642 | A * | 6/2000 | Huang | F16B 7/182 135/120.3 |
| 6,328,047 | B1 * | 12/2001 | Lee | A45B 17/00 403/291 |
| 6,840,702 | B2 * | 1/2005 | Ko | F16B 12/36 403/294 |
| 7,186,050 | B2 * | 3/2007 | Dean | F16B 7/0413 403/379.6 |
| 7,802,582 | B2 * | 9/2010 | Livacich | E04H 15/44 135/147 |
| 8,132,979 | B2 * | 3/2012 | Orava | E04B 1/0023 52/302.1 |
| 8,181,661 | B2 * | 5/2012 | Livacich | E04H 15/001 135/117 |
| 9,719,544 | B2 * | 8/2017 | Bay | F16B 7/025 |
| 10,077,893 | B1 * | 9/2018 | Abraham | E04H 12/2223 |
| 10,537,161 | B1 * | 1/2020 | Volin | A45B 25/10 |
| 10,993,572 | B2 * | 5/2021 | Loomis | H05B 47/155 |
| 11,141,016 | B2 * | 10/2021 | Chuang | A47H 1/022 |
| 11,788,566 | B2 * | 10/2023 | Willis | B25G 1/04 403/296 |
| 2003/0050132 | A1 * | 3/2003 | Wilbur | A63B 53/12 473/323 |
| 2008/0317546 | A1 * | 12/2008 | Daum | F16B 7/182 403/184 |
| 2010/0259041 | A1 * | 10/2010 | Tsan | F16B 7/182 285/331 |
| 2016/0081444 | A1 * | 3/2016 | Munsch | F16M 11/22 248/524 |
| 2021/0107132 | A1 * | 4/2021 | Spinelli | F16B 7/182 |
| 2023/0255723 | A1 * | 8/2023 | Teschke | A61B 90/39 403/342 |
| 2024/0011517 | A1 * | 1/2024 | Willis | B25J 18/025 |

FOREIGN PATENT DOCUMENTS

| | | | | |
|---|---|---|---|---|
| EP | 3808211 | A1 * | 4/2021 | A46B 17/02 |
| KR | 0129576 | Y1 * | 12/1998 | E04H 15/60 |
| KR | 102649127 | B1 * | 3/2024 | E04C 5/165 |
| WO | WO-2020101782 | A1 * | 5/2020 | A45B 19/08 |

* cited by examiner

RAPID ASSEMBLY STRUCTURE FOR ASSEMBLING UPRIGHT POST OF OUTDOOR PRODUCT AS WELL AS OUTDOOR UMBRELLA AND OUTDOOR TENT

CROSS-REFERENCE TO RELATED APPLICATION

This application claims the priority benefit of CN application serial no. 202221315608.X, filed on May 30, 2022. The entirety of the above-mentioned patent application is hereby incorporated by reference herein and made a part of this specification.

BACKGROUND

Technical Field

The present invention relates to the field of outdoor products, and particularly to a rapid assembly structure for assembling an upright post of an outdoor product as well as an outdoor umbrella and outdoor tent.

Description of Related Art

As people continue to pursue a higher standard of living and lifestyle, more and more people enjoy the outdoor activities. People often use outdoor products, such as outdoor tents, outdoor umbrellas and outdoor furniture, when taking a rest in urban squares and green areas, parks, seaside beaches or pools.

At present, common outdoor products, especially outdoor tents and outdoor umbrellas, usually have leg tubes, upright posts and umbrella posts, which are usually long. To reduce the package, a disassembly structure is usually used. For this reason, the publication No. CN210841818U discloses a connecting structure of upper and lower umbrella posts of a sunshade umbrella, belonging to the field of sunshade umbrellas. It solves the problem of spending high cost on connecting the upper umbrella post to the lower umbrella post of the current sunshade umbrella. The sunshade umbrella includes an upper umbrella post and a lower umbrella post, both of which are of a tubular shape; the connecting structure includes a concave-convex internal thread section formed by integrally pressing a bottom part of the upper umbrella post and a concave-convex external thread section formed by integrally pressing a top part of the lower umbrella post, and the internal and external thread sections are connected in a threaded manner to fixedly connect the upper umbrella post to the lower umbrella post in a threaded manner. Based on the connecting structure, the upper umbrella post of the sunshade umbrella is connected to the lower umbrella post thereof with a low cost.

In the aforesaid structure, the upper and lower umbrella posts are docked by rotationally pressing the internal and external thread structures of a thread stroke respectively. However, a straight screw-thread fit structure is employed to easily cause loosening during long-term use; and meanwhile the structure needs to process and form the umbrella post bodies, which results in relatively tedious production.

SUMMARY

In view of the aforesaid problems, the present invention provides a rapid assembly structure for assembling an upright post of an outdoor product as well as an outdoor umbrella and outdoor tent. The segmental upright posts are rapidly assembled and installed by using a sleeve assembly. The rapid assembly structure features stable installation, convenient assembly and wide practicability.

The technical problem solved by the present invention may be implemented by the following technical solution:

A rapid assembly structure for assembling an upright post of an outdoor product, comprising an upright post, wherein the upright post comprises a first upright post and a second upright post; the rapid assembly structure further comprises a sleeve assembly, wherein the sleeve assembly comprises a first sleeve base and a second sleeve base, the first sleeve base is configured to install the first upright post in a fitting manner, the second sleeve base is configured to install the second upright post in a fitting manner and the first upright post is connected to the second upright post by the fit of the first sleeve base and the second sleeve base; after the first sleeve base is in docking fit in with the second sleeve base, a partial side wall in the first sleeve base extends outwards and is in close fit with an inner cavity wall of the first upright post.

The first sleeve base is fully embedded into an inner cavity of the first upright post; the first sleeve base comprises a first sleeve body and a first connecting base, and a maximum outside diameter of the first sleeve body is greater than that of the first connecting base.

One end of the second upright post is provided with a connecting end, and the connecting end is embedded into the inner cavity on an end of the first upright post.

A thread groove is provided in the first connecting base and is a tapered structure; the second sleeve base comprises a second sleeve body and a second connecting base, wherein the second connecting base is provided with a threaded end, and the threaded end is of a tapered shape and is configured to fit with the thread groove.

An internal thread is arranged in the thread groove, extends inwards from a port in a gradually reducing manner, and is provided with an external thread; and the external thread is provided on the threaded end and extends downwards from an upper end plane in a gradually expanding manner.

The first connecting base is provided with a flaring gap, and an outer side wall of the first connecting base is provided with a plurality of stoppers.

A stop collar is provided between the second sleeve body and the second connecting base, and a stepped portion is provided between the second sleeve body and the stop collar.

The second sleeve body is fully embedded into an inner cavity of the connecting end, a stop collar is clamped to a port on the connecting end, and the second connecting base protrudes outwards from the port on the connecting end.

An outdoor umbrella based on a rapid assembly structure for assembling an upright post, wherein the upright post is docked through a sleeve assembly, and the upright post is an umbrella post on which an umbrella cover is provided in a fitting manner.

An outdoor tent based on a rapid assembly structure for assembling an upright post, wherein the upright posts are docked through sleeve assemblies, and the upright posts are tent leg tubes on which a tent frame is provided in a fitting manner.

Compared with the prior art, the present invention has the following beneficial effects: the segmental upright post can be rapidly assembled by optimally designing and using the fit of the sleeve assembly, wherein the tapered screw-thread fit structure is preferably employed to enable the second sleeve base to flare and extrude the first sleeve base outwards during the continuous thread fit; an externally expandable structure of a side wall in the first sleeve base is employed to enable close fit between the first sleeve base and the inner cavity of the upright post after the sleeve assembly is assembled, thus improving the stability upon assembly; and meanwhile, in case of loosening later, adaptive adjustment can be implemented by an extrusion effect realized by continuous upward screw fit, thus improving the assembly stability and service life, and enhancing the overall operational performance.

The characteristics of the present invention can be clearly understood by referring to the detailed descriptions of the drawings and the following embodiments.

Figure 1:
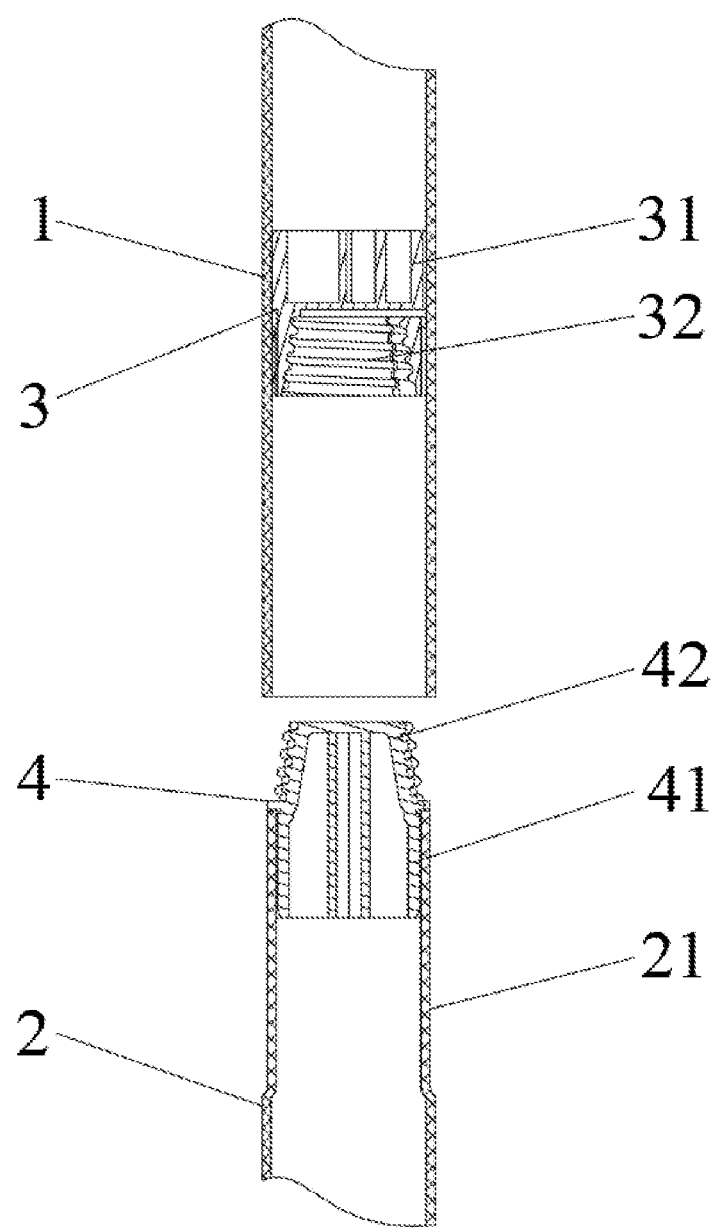
FIG. 1 is a schematic sectional view of an installation structure of an upright post and a sleeve assembly of the present invention.
Figure 2:
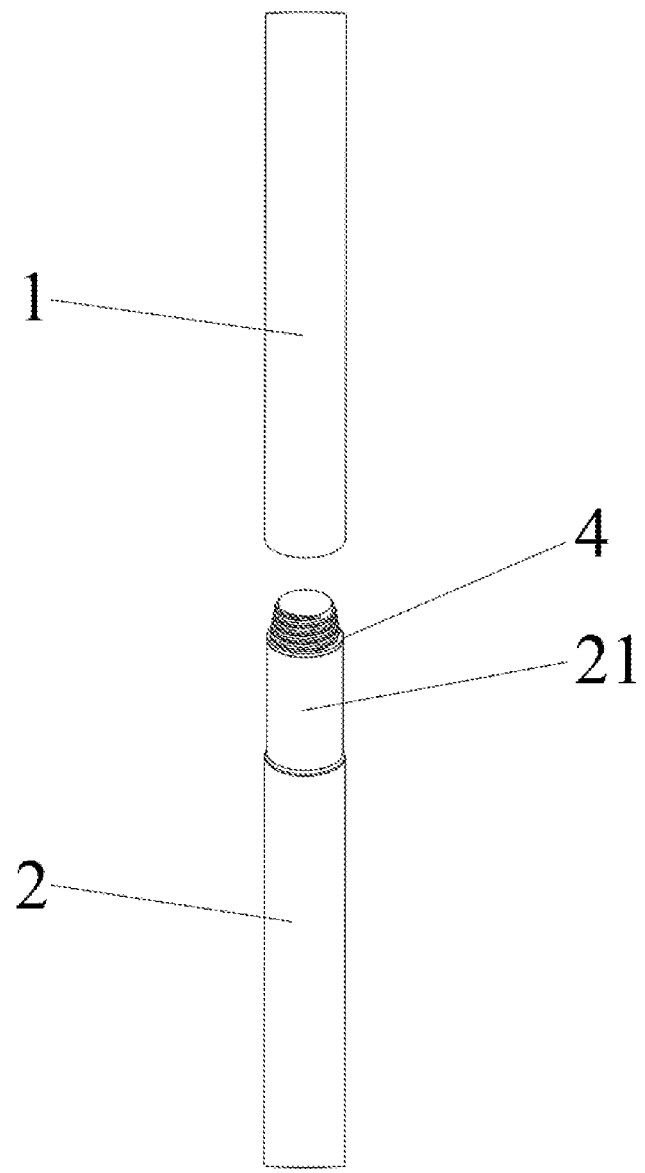
FIG. 2 is a schematic diagram of an installation structure of an upright post and a sleeve assembly of the present invention.
Figure 3:
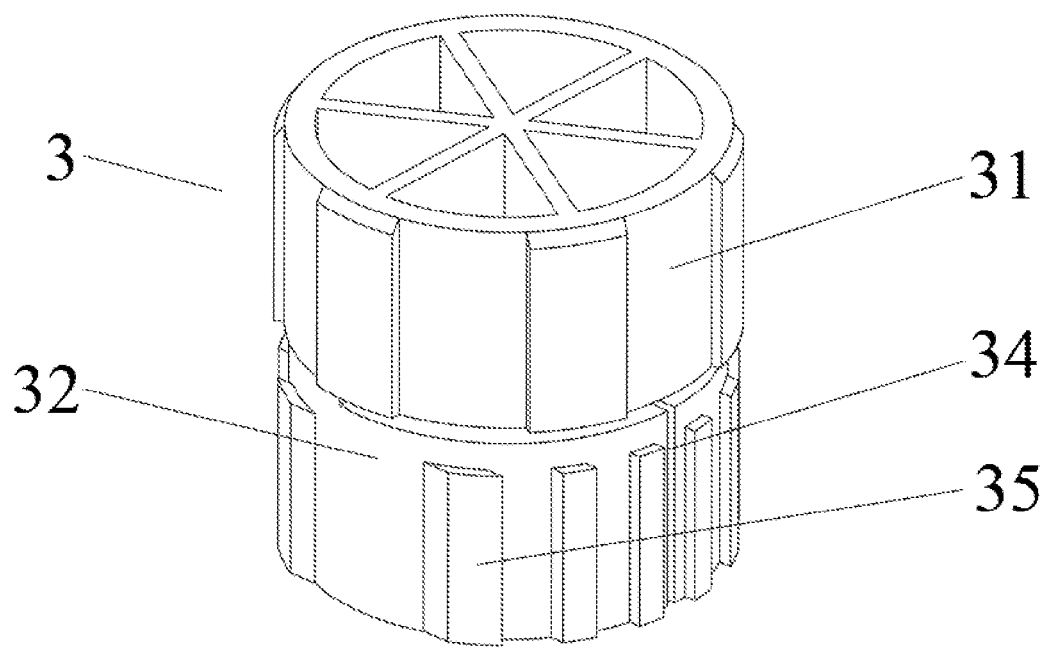
FIG. 3 is a schematic structural diagram of a first sleeve base of the present invention.
Figure 4:
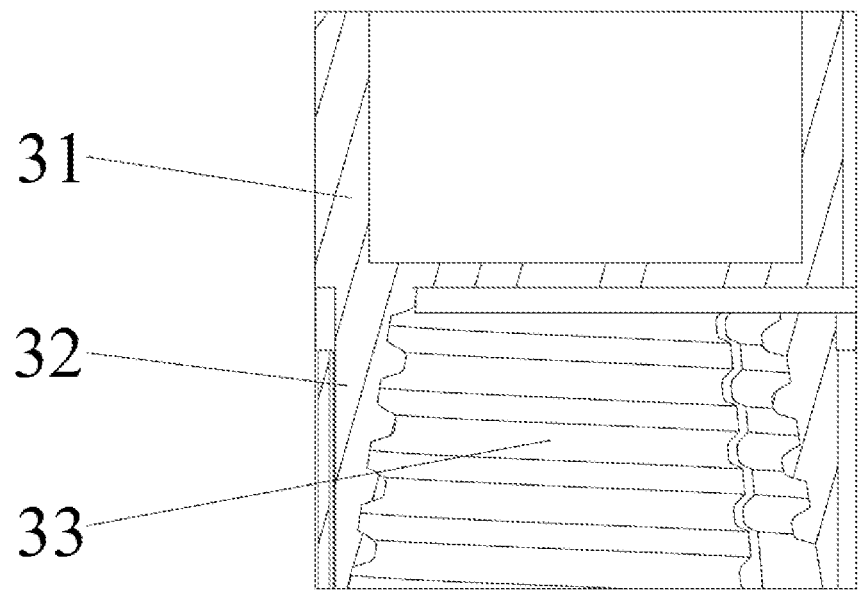
FIG. 4 is a schematic sectional structural view of a first sleeve base of the present invention.
Figure 5:
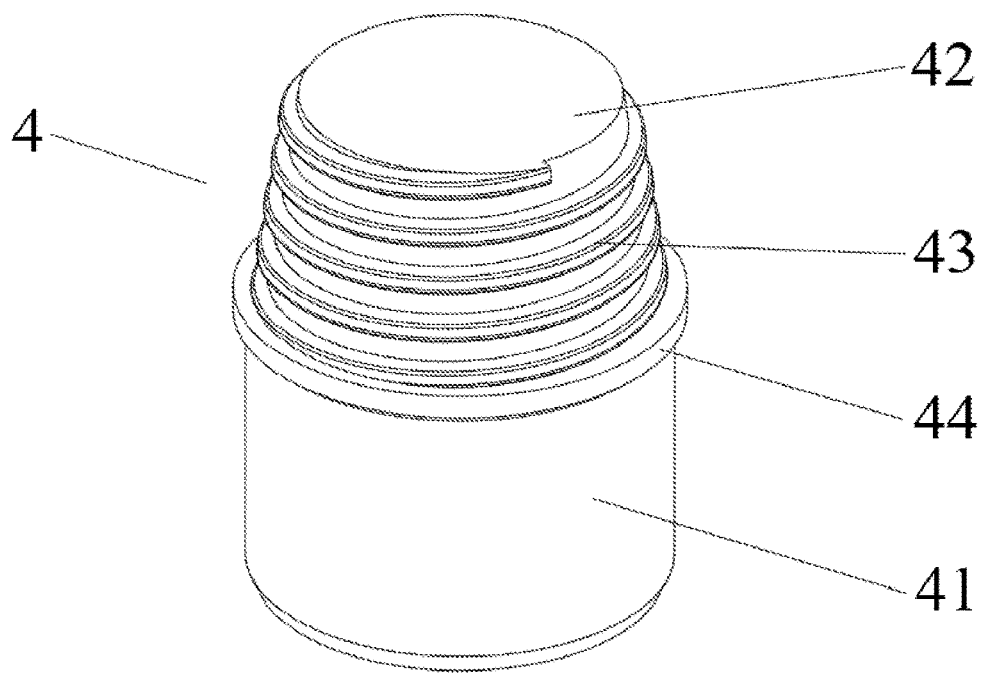
FIG. 5 is a schematic structural diagram of a second sleeve base of the present invention.

in which: 1. first upright post; 2. second upright post; 21. connecting end; 3. first sleeve base; 31. first sleeve body; 32. first connecting base; 33. thread groove; 34. flaring gap; 35. stopper; 4. second sleeve base; 41. second sleeve body; 42. second connecting base; 43. threaded end; 44. stop collar.

DESCRIPTION OF THE EMBODIMENTS

In order to make the technical means, creative features, achieved objectives and effects easy to understand, the present invention will be further elaborated by combining the specific illustration.

Embodiment 1

With reference to FIGS. 1-5, the embodiment discloses a rapid assembly structure for assembling an upright post of an outdoor product, comprising the upright post, wherein the upright post includes a first upright post 1 and a second upright post 2; the rapid assembly structure further includes a sleeve assembly, wherein the sleeve assembly includes a first sleeve base 3 and a second sleeve base 4, the first sleeve base 3 is configured to install the first upright post 1 in a fitting manner, the second sleeve base 4 is configured to install the second upright post 2 in a fitting manner and the first upright post 1 is connected to the second upright post 2 by the fit of the first sleeve base 3 and the second sleeve base 4; after the first sleeve base 3 is in docking fit with the second sleeve base 4, a partial side wall in the first sleeve base 3 extends outwards and is in close fit with an inner cavity wall of the first upright post 1; in an attempt to optimize the aforesaid structure, the sleeve assembly can be used as a connecting component to rapidly assemble and install the first upright post 1 and the second upright post 2; and meanwhile, in order to optimize the design, the side wall of an expandable structure provided in the first sleeve base 3 is employed for further stable setting upon the assembly during the assembly, thus improving the connecting stability between the first upright post 1 and the second upright post 2.

In a specific structure, the first sleeve base 3 is fully embedded into an inner cavity of the first upright post 1, a maximum outside diameter of the first sleeve body 31 is greater than that of the first connecting base 32, and one end of the second upright post 2 is provided with a connecting end 21 embedded into an inner cavity on an end of the first upright post 1. The structure is employed to facilitate the connection between the first upright post 1 and the second upright post 2; and meanwhile, the connecting end is optimally provided to enable a long contact surface on a connection between the first upright post 1 and the second upright post 2, thus improving the stability of the connection part.

The first sleeve base 3 comprises a first sleeve body 31 and a first connecting base 32, and a thread groove 33 is provided in the first connecting base 32 and is a tapered structure; the second sleeve base 4 comprises a second sleeve body 41 and a second connecting base 42, a threaded end 43 is provided on the second connecting base 42 and configured to fit in with the thread groove 33, and is of a tapered shape; an internal thread is provided in the thread groove 33 and extends inwards from a port in a gradually reducing manner, an external thread is provided on the threaded end 43 and extends downwards from an upper end plane in a gradually expanding manner, the first connecting base 32 is provided with a flaring gap 34, and an outer side wall of the first connecting base 32 is provided with a plurality of stoppers 35; during the assembly, the threaded end 43 on the second connecting base 42 is docked to the thread groove 33 in the first connecting base 32; with the fit of the tapered internal and external thread structures during the assembly, the threaded end 43 rotates upwards continuously due to the tapered structure during the continuous rotation; after the thread groove 33 is continuously stressed, an outer side wall of the first connecting base 32 expands outwards continuously along the flaring gap 34, and the plurality of stoppers 35 on the outside wall of the first connecting base 32 extrude outwards continuously to fit snugly against the inner cavity wall of the first upright post 1, thus improving the overall installation stability; and moreover, in case of loosening later, the structure can be designed to continuously rotate upwards for further extrusion and stress, thus enhancing the installation stability between the first upright post 1 and the second upright post 2.

Preferably, a stop collar 44 is arranged between the second sleeve body 41 and the second connecting base 42, a stepped portion is provided between the second sleeve body 41 and the stop collar 44, the second sleeve body 41 is fully embedded into the inner cavity on the connecting end 21 and the stop collar 44 is clamped to a port of the connecting end 21; the second connecting base 42 protrudes outwards, particularly protrudes out of the port on the connecting end 21; the structure facilitates the assembly of an end part of the second upright post 2 into the second sleeve base 41, and the fit installation of the first sleeve base 3 into the inner cavity of the first upright post 1.

According to the present invention, the segmental upright post can be rapidly assembled by optimally designing and using the fit of the sleeve assembly, wherein the tapered screw-thread fit structure is preferably employed to enable the second sleeve base to flare and extrude the first sleeve base outwards during the continuous screw-thread fit; an external expansion structure of a side wall in the first sleeve base is employed to enable close fit between the first sleeve base and the inner cavity of the upright post after the sleeve assembly is assembled, thus improving the stability upon assembly; and meanwhile, in case of loosening later, adaptive adjustment can be implemented by an extrusion effect realized by continuous upward screw-thread fit, thus improving the assembly stability and service life, and enhancing the overall operational performance.

Embodiment 2

Figure 6:
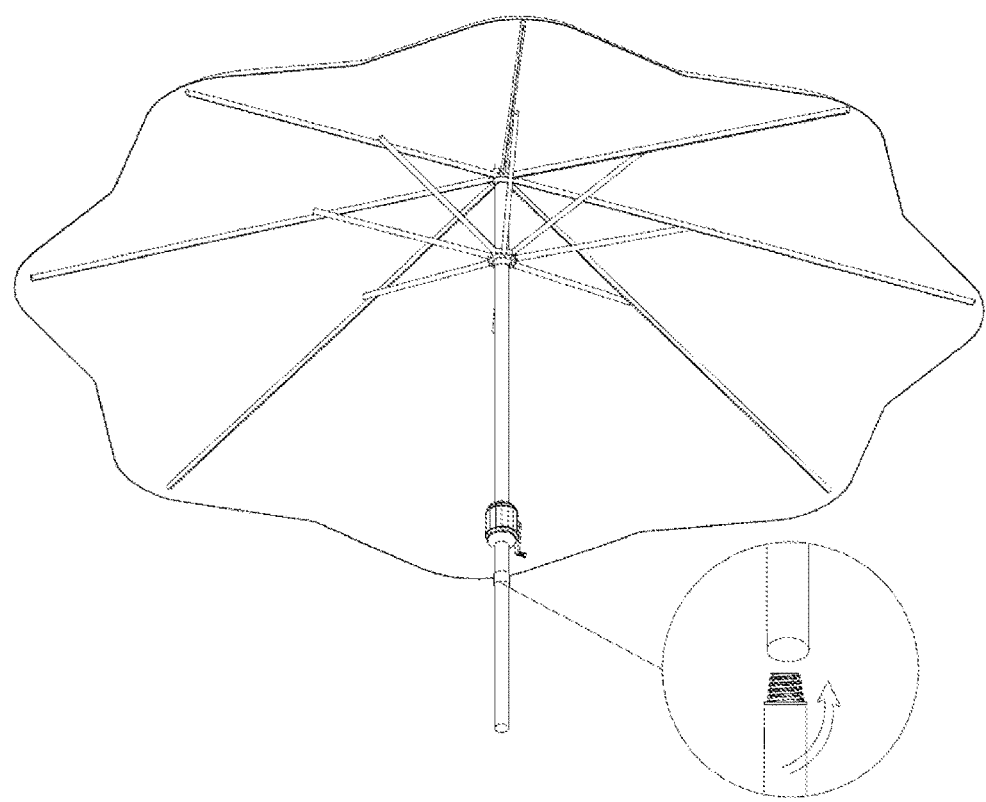
FIG. 6 is a schematic structural diagram in Embodiment 2.

Based on Embodiment 1 and in conjunction with FIG. 6, the embodiment discloses an outdoor umbrella based on a rapid assembly structure for assembling an upright post, wherein the upright post is docked through a sleeve assembly, and the upright post is an umbrella post on which an umbrella cover is provided in a fitting manner.

A structure combining the upright post with the sleeve assembly in the outdoor umbrella should be especially applicable to umbrellas with central handle and hanging umbrellas.

Embodiment 3

Figure 7:
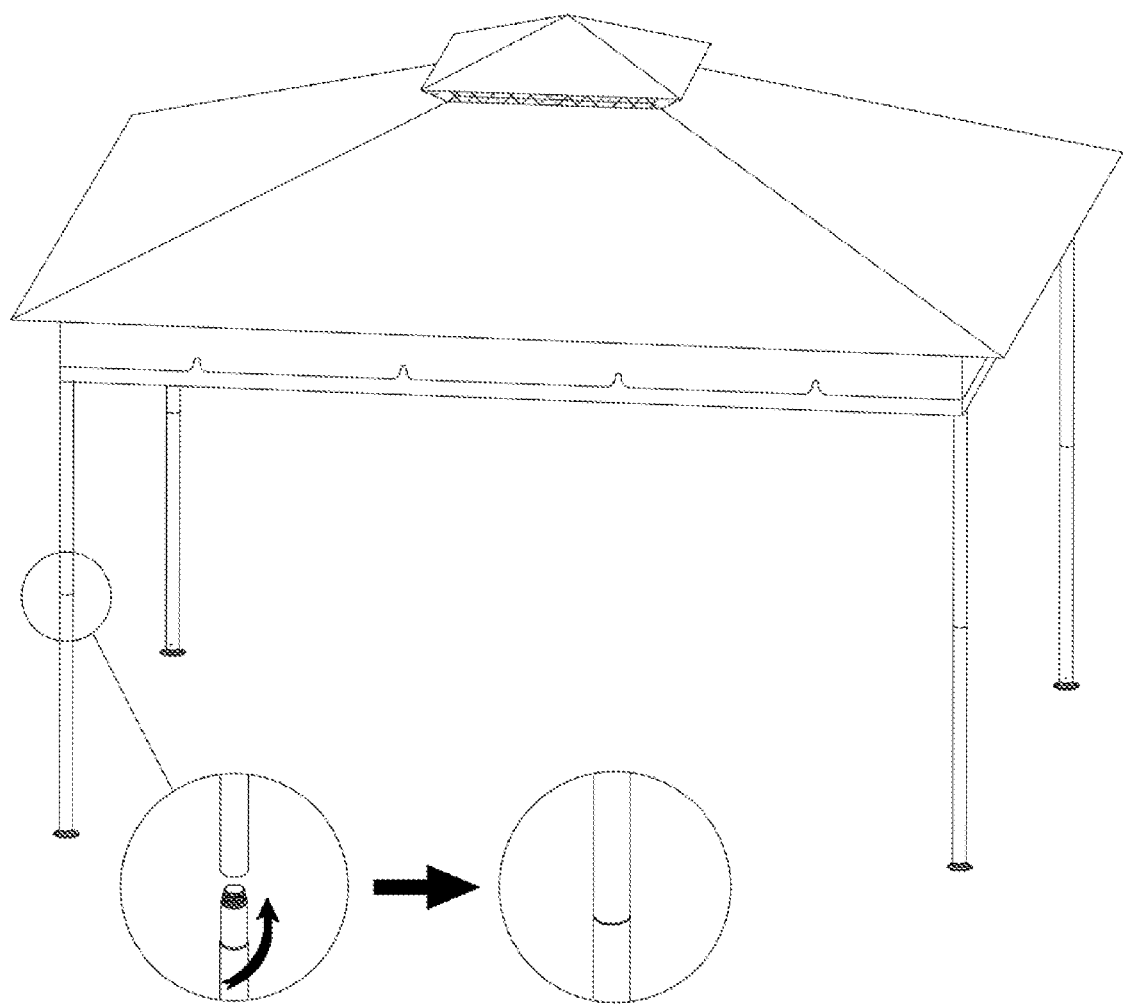
FIG. 7 is a schematic structural diagram in Embodiment 3.

Based on Embodiment 1 and with reference to FIG. 7, the embodiment discloses an outdoor tent based on a rapid assembly structure for assembling an upright post, the upright posts are docked through sleeve assemblies, and the upright posts are tent leg tubes on which a tent frame is provided in a fitting manner.

What is said above is the preferred embodiments of the present invention, but is not intended to limit the present invention in any form. Any simple changes, substitutions and alterations made based on the technical principle of the present invention still fall with the scope of the technical solution of the present invention.

What is claimed is:

1. A rapid assembly structure for assembling an upright post of an outdoor product, comprising an upright post, wherein the upright post comprises a first upright post and a second upright post; the rapid assembly structure further comprises a sleeve assembly, wherein the sleeve assembly comprises a first sleeve base and a second sleeve base, the first sleeve base is configured to install the first upright post in a fitting manner, the second sleeve base is configured to install the second upright post in a fitting manner and the first upright post is connected to the second upright post by a connection between the first sleeve base and the second sleeve base; after the first sleeve base is in docking fit with the second sleeve base, a partial side wall in the first sleeve base extends outwards and is in close fit with an inner cavity wall of the first upright post, wherein the first sleeve base is fully embedded into an inner cavity of the first upright post; the first sleeve base comprises a first sleeve body and a first connecting base, and a maximum outside diameter of the first sleeve body is greater than that of the first connecting base, wherein one end of the second upright post is provided with a connecting end, and the connecting end is embedded into the inner cavity on an end of the first upright post, wherein a thread groove is provided in the first connecting base and is a tapered structure; the second sleeve base comprises a second sleeve body and a second connecting base, wherein the second connecting base is provided with a threaded end, and the threaded end is of a tapered shape and is configured to fit in with the thread groove, wherein the first connecting base is provided with a flaring gap, and an outer side wall of the first connecting base is provided with a plurality of stoppers.

2. The rapid assembly structure for assembling the upright post of the outdoor product according to claim 1, wherein an internal thread is arranged in the thread groove, extends inwards from a port in a gradually reducing manner, and the threaded end is provided with an external thread; and the external thread extends downwards from an upper end plane in a gradually expanding manner.

3. The rapid assembly structure for assembling the upright post of the outdoor product according to claim 1, wherein a stop collar is provided between the second sleeve body and the second connecting base, and a stepped portion is provided between the second sleeve body and the stop collar.

4. The rapid assembly structure for assembling the upright post of the outdoor product according to claim 3, wherein the second sleeve body is fully embedded into an inner cavity of the connecting end, the stop collar is clamped to a port on the connecting end, and the second connecting base protrudes outwards from the port on the connecting end.

5. An outdoor umbrella based on a rapid assembly structure for assembling an upright post, comprising the rapid assembly structure for assembling the upright posts of the outdoor product according to claim 1, wherein the upright post is docked through the sleeve assembly, and the upright post is an umbrella post on which an umbrella cover is provided in a fitting manner.

6. An outdoor tent based on a rapid assembly structure for assembling an upright post, comprising the rapid assembly structure for assembling the upright posts of the outdoor product according to claim 1, wherein the upright posts are docked through the sleeve assembly, and the upright posts are tent leg tubes on which a tent frame is provided in a fitting manner.

* * * * *